United States Patent [19]
Kantorovich et al.

[11] 3,758,767
[45] Sept. 11, 1973

[54] DIGITAL SERIAL ARITHMETIC UNIT

[76] Inventors: Leonid Vitalievich Kantorovich, ulitsa Akademicheskaya, 26; Valery Petrovich Tolstiev, ulitsa Zolotodolinskaya, 29, kv. 424; Yakov Ilich Fet, ulitsa Akademicheskaya, 13, kv. 8, all of Novosibirsk, U.S.S.R.

[22] Filed: Oct. 19, 1971

[21] Appl. No.: 190,610

[52] U.S. Cl. .................. 235/159, 235/156, 235/176
[51] Int. Cl. ............................ G06f 7/50, G06f 7/52
[58] Field of Search .................... 235/159, 160, 164, 235/156, 176

[56] References Cited

UNITED STATES PATENTS 3,519,809 7/1970 Iverson .............................. 235/164

*Primary Examiner*—Malcolm A. Morrison
*Assistant Examiner*—David H. Malzahn
*Attorney*—Eric H. Waters, John G. Schwartz et al.

[57] ABSTRACT

Digital serial arithmetic unit comprising: a unit for multiplying one-digit figures, an adding unit, three rows of input gates and a row of output gates. The outputs of the input gate rows are connected with the respective inputs of the multiplying unit and with those of the adding unit. The outputs of the multiplying unit are connected with the respective inputs of the adding unit while the outputs of the adding unit are connected with the inputs of the output gate row.

2 Claims, 1 Drawing Figure

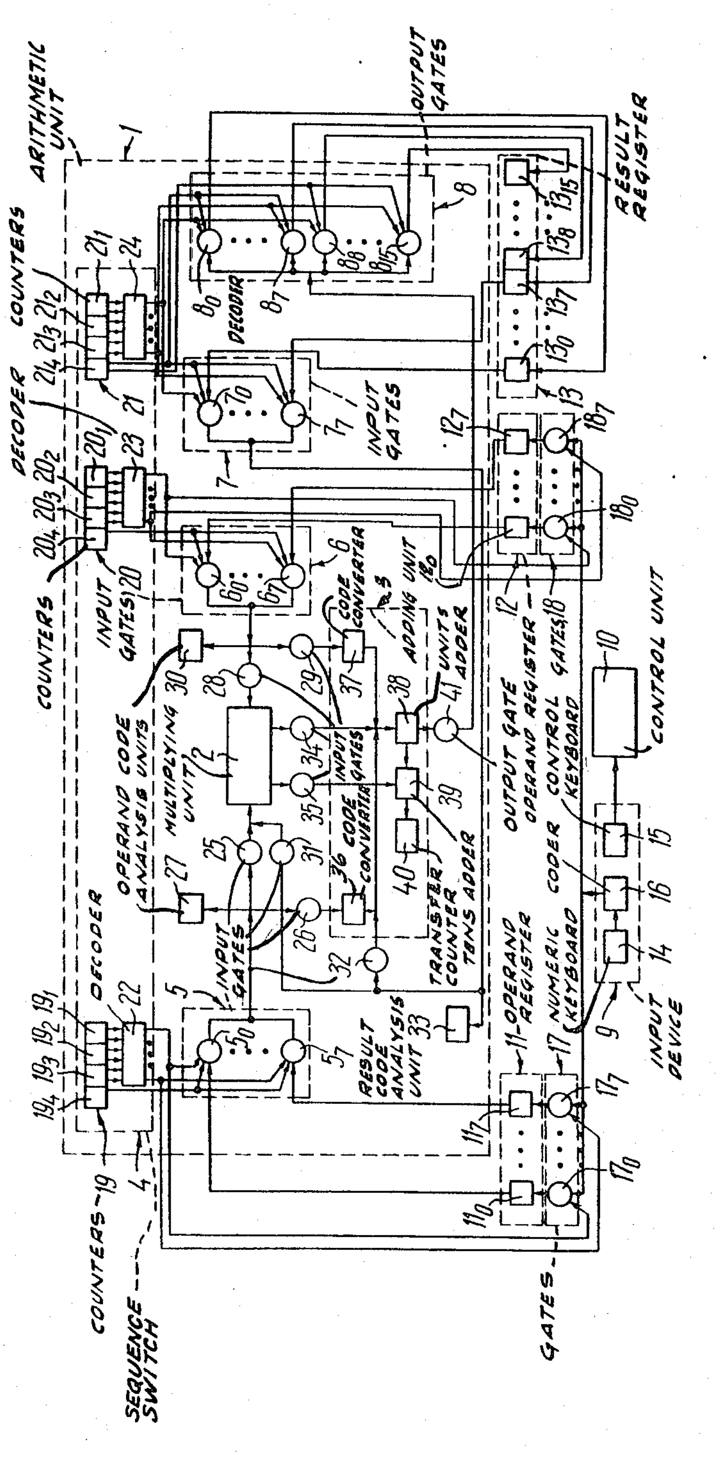
ARITHMETIC UNIT
COUNTERS
DECODER
OUTPUT GATES
RESULT REGISTER
DECODER
INPUT GATES
INPUT GATES
CODE CONVERTER
ADDING UNIT
UNITS ADDER
OPERAND CODE ANALYSIS UNITS
MULTIPLYING UNIT
INPUT GATES
CODE CONVERTER
TRANSFER COUNTER
TENS ADDER
OUTPUT GATE
OPERAND REGISTER
CONTROL GATES
CONTROL UNIT
CONTROL KEYBOARD
CODER
NUMERIC KEYBOARD
OPERAND REGISTER
INPUT DEVICE
DECODER
RESULT CODE ANALYSIS UNIT
COUNTERS
SEQUENCE SWITCH
GATES

DIGITAL SERIAL ARITHMETIC UNIT

BACKGROUND

1. Field of the Invention

The present invention relates to digital computers, particularly to serial arithmetic units.

2. Prior Art

Widely known in the art are serial arithmetic units which comprise a multiplying unit, an adding unit, input and output gates and perform all arithmetic operations with numbers fed into them. Certain operations, however, require that operands should be changed.

A disadvantage of the known arithmetic units consists in that the process of performing arithmetic operations requires conversions of operands, and the latter should be stored in a fast read-write memory.

In cases when a data source is a simple device, (a read-only unit, an electromechanical sensor, etc.) the known arithmetic units require that an additional read-write memory be used in conjunction with them.

SUMMARY OF THE INVENTION

An object of the present invention is to provide an arithmetic unit which avoids this disadvantage and which performs all form arithmetic operations with no employment of a fast read-write memory for storing operand conversions.

This objective is attained in an arithmetic unit comprising: a unit for multiplying single-place figures, an adding unit, input and output gates of the arithmetic unit, input and output gates of the adding and multiplying units, all the gates being divided into groups in accordance with the numeric coding method used in the system, in which, according to the present invention, the adding unit comprises two code converters, two single-place adders and a transfer counter. The inputs of the first group of the multiplying unit input gates are connected with the respective inputs of the first group of the adding unit input gates and with the respective outputs of a first row of the input gate groups of the arithmetic unit. The inputs of the second group of the multiplying unit input gates are connected with the respective inputs of the second group of the adding unit input gates and with the respective outputs in a second row of the input gate groups of the arithmetic unit. The inputs of a third group of the multiplying unit input gates are connected with the respective inputs of the third group of the adding unit input gates and with the respective outputs in the third row of the arithmetic unit input gate groups. The outputs of the first group of the multiplying unit input gates are connected with the respective outputs of the third group of the multiplying unit input gates and with the respective first factor inputs of the multiplying unit. The outputs of the second group of the multiplying unit input gates are connected with the respective second factor inputs of the multiplying unit. The low-order digit outputs of the product of the multiplying unit are connected with the respective inputs of the fourth group of the adding unit input gates. The high-order digit outputs of the product of the multiplying unit are connected with the respective inputs of the fifth group of the adding unit input gates. The outputs of the first group of the adding unit input gates are connected with the respective inputs of the first code converter of the adding unit; the outputs of the second group of the adding unit input gates are connected with the respective inputs of the second code converter of the adding unit. The inputs of the low-order digit adder of the adding unit are connected with the respective outputs of the third and fourth groups of the adding unit input gates as well as with the respective outputs of the first and second code converters. The inputs of the high-order digit adder of the adding unit are connected with the respective outputs of the fifth group of the adding unit input gates. The carry output of the low-order digit adder is connected with the respective input of the high-order digit adder while the carry output of the high-order digit adder is connected with the input of the adding unit carry counter. The sum outputs of the low-order digit adder of the adding unit are connected with the respective inputs of the output gate group of the adding unit while their outputs are connected with the respective inputs of all the groups of the row of the adding unit output gates. The arithmetic unit is provided with a timing means controlling all groups of the arithmetic unit input and output gates, the timing means being designed so as to ensure the sequence of gate operations that is required to perform any type of arithmetic operations.

It is advisable that the timing means of the arithmetic unit,according to the present invention, should use three reversible binary counters and three decoders arranged so that: all digit outputs of the first reversible counter, with the exception of its high-order digit output, are connected with the respective inputs of the first decoder, whose outputs are connected in a digit-by-digit manner with the first control inputs of all input gates in the respective first row groups; the second control inputs of all gates in the first row are connected in parallel with the zero high-order digit output of the first reversible counter; all digit outputs of the second reversible counter, with the exception of its high-order digit output, are connected with the respective inputs of the second decoder, whose outputs are connected in a digit-by-digit manner with the first control inputs of all input gates in the respective second row groups; the second control inputs of all second row gates are connected in parallel with the zero high-order digit output of the third reversible counter, all digit outputs of the third reversible counter, with the exception of its high-order digit output, are connected with the respective inputs of the third decoder, whose outputs are connected in a digit-by-digit manner with the first control inputs of all input gates in the respective third row groups, as well as with the control inputs of the arithmetic unit respective output gate groups; the second control inputs of all third row gates are connected in parallel with the zero high-order digit output of the third reversible counter.

The employment of the present invention in the design of digital computers operating with simple data sources can result in a substantial saving of hardware. The present invention can be used as a basis for simple digital computers such as those used to process measurement and production data for tabulators, accounting machines, cash registers, etc.

BRIEF DESCRIPTION OF THE DRAWING

This arithmetic unit will now be described in detail by way of example as used in an electronic keyboard calculator operating with eight-digit decimal numbers presented in a binary-decimal code with reference to the accompanying drawing, the sole FIGURE of which is a functional diagram of an eight-bit keyboard electronic computer using an arithmetic unit designed according to the present invention.

DETAILED DESCRIPTION

The structure of the arithmetic unit according to the present invention is applicable with no modifications for processing numbers of any amount of digits presented in any position number system and in various codes.

The operation of the present arithmetic unit will be better understood from a description of the procedure it employs to perform the operations of adding, subtracting, multiplying and dividing of numbers.

The order of digits in the numbers to be processed in the arithmetic unit will be designated by the respective power of the base which determines the weight of the digit. Thus, the units digit will be called the zero order, the tens digit will be called the first order, etc.

The process involved in calculating every digit of the result will be called the elementary cycle while the number of the elementary cycle will be considered equal to the number of the bit order of the result obtained at the end of the given cycle.

Addition. The zero elementary cycle of summing up two numbers involves the adding of zero decimal bits (digits of units) of the addends to obtain the zero digit of the sum, and possibly the carry unit to be transferred to the tens digit (the latter result is possible in case the sum of digits of the units appears to exceed nine). The first cycle involves the adding of first bits (digits of tens) of the operands and of the possible transfer from the units digit, etc.

The high-order digit of the sum is formed as the sum of the addend high-order digits and the possible transfer from the preceeding low-order digits if this sum is less than 10 or as a carry digit if the sum exceeds nine. In the first case the number of the adding cycles will be equal to the number of digits in the greater addend and in the second case it will be one unit greater.

Subtraction. As is known, the operation of substraction in digital computers is generally carried out either by summing up reverse or inverted codes of the operands in the adder with a subsequent cyclic transfer or by summing up complementary codes in the adder without a cyclic transfer. If, in this case, the difference is negative it is required that, before the result is read out from the arithmetic unit, the code of the result should be inverted.

In order to be able to use simple data sources and avoid the necessity of using additional equipment required to perform the above mentioned code inversion, it is sufficient that in the course of every subtraction operation the minuend be regarded as a positive quantity and the subtrahend, as a negative one and the function of the minuend be performed by that of the operands whose absolute value is greater. Then, the result of a subtraction carried out by the computer will always be positive. Hence, the output of the arithmetic unit will receive the results of digit-by-digit operations expressed in complementary codes which, under the given conditions, will coincide with direct ones. As for the sign of the result, it can be easily determined on the basis of operands and the relative values of their moduli.

A computer's subtraction process consists of two stages.

The object of the first stage is to compare the absolute values of operands. In the course of performing the required operations the first operand is always sent to the adder as a direct code number and the second as a reverse code number. The result of this adding operation is not fed to the output. The relative value of the operands is determined through the presence or absence of a transfer after the high-order digits have been added. The presence of a transfer indicates that the first operand is greater than the second; if there is no transfer the second operand is regarded as having a smaller value than the first.

The second stage of the subtraction process is carried out in accordance with the results of the comparison performed during the first stage, i.e., the operand of a lower absolute value is sent to the adder in the complementary code and the one of a higher value-in the direct code. Then, serial digit-by-digit summing up is performed, with no account being taken of the cyclic transfer.

Multiplication. The multiplication in the proposed arithmetic unit is carried out by the so called "cross" method, which consists in the following.

Two $n$-bit numbers are multiplied by means of performing $2n$ elementary cycles.

A zero elementary cycle produces one elementary product obtained by multiplying the zero (low-order) digit of the multiplicand by the zero (low-order) digit of the multiplier. The low-order digit of this elementary product is equal to the zero (low-order) digit of the final product while its high-order digit is a carry unit to the first digit of the product.

The first elementary cycle produces two elementary products obtained by multiplying the zero digit of the multiplicand by the first digit of the multiplier and the first digit of the multiplicand by the zero digit of the multiplier. The partial product of the first cycle is equal to the sum of these two elementary products and the carry digit obtained during the zero cycle. The low-order digit of the first cycle partial product is equal to the first digit of the final product while its high-order digits are the transfers to the next digits.

During every successive cycle-from the $0^{th}$ to the $(n-1)$ th —the number of elementary products increases by one, and from the $(n-1)$ th to the $(2n-1)$th it decreases by one. Elementary products obtained during every cycle are presented as various pairs of operand digit figures (every pair comrises one figure of the multiplicand and one figure of the multiplier), the sum of the digit numbers of both figures comprising any pair being equal to the number of the cycle.

Every cycle results in the exact value of the final product single digit whose number is equal to the number of a cycle. The high-order, i.e., the $(2n-1)$th, digit of the final product is equal to the transfer obtained during previous cycle.

Division. Known digital computers usually perform the operation of division by successively subtracting the divisor from the current remainder with its subsequent restoration and a single-place shift. To ensure the employment of simple data sources and to reduce the amount of required electronic equipment, the operation of division in the proposed arithmetic unit is performed by the quotient figure trial method.

The next-in-turn figure of the quotient (beginning with the high-order digit) is formed by means of successive trials (from 1 to 9). Every trial consists in multiplying the divisor by all digits of the quotient obtained in the course of previous cycles /including the low-order one which serves as the trial figure/. The trial divisor multiples, that are being calculated are subtracted from the corresponding high-order part of the dividend. If the difference is positive, the given digit of the quotient is tried by the next high-order digit. If it is negative, the figure of the preceding trial is put down as the final value of the given digit of the quotient. As described above the subtraction and multiplication procedures used in the proposed arithmetic unit permit to perform the operation of division without resorting to memories for storing divisor multiples and remainders and to avoid any source information alterations. This is ensured as follows. Every elementary multiplication cycle (see the description of the multiplication procedure) produces the exact figure of the current digit of the product.

This figure is immediately added to the reverse code of the respective digit of the dividend. After all digits of the product are processed, by the presence or absence of a cyclic transfer it becomes possible to assess the sign of the difference, which is the only detail that is necessary to try the respective figure of the quotient for the next time. The successive digit-by-digit comparison of the divisor multiple with the dividend, which is performed in this case, is similar to the procedure of the operand comparison in the course of the first stage of the subtraction operation (see the description of the subtraction operation).

The calculator, disclosed herein, is provided with an arithmetic unit 1, designed in accordance with the present invention which, comprises a multiplying unit 2 to multiply single place numbers, an adding unit 3, a timing means 4, a first row of input gates 5, a second row of input gates 6 and a third 7 row of input gates, and a row of output gates 8. Additionally, the computer is provided with conventional units and assemblies, i.e., an input device 9, a control unit 10, a first operand register 11, a second operand register 12 and a result register 13.

The input device 9 has a numeric keyboard 14, a control keyboard 15 and a coder 16. The outputs of the numeric keyboard 14 are connected with the respective inputs of the coder 16. The outputs of the control keyboard 15 are connected with the corresponding inputs of the control device 10.

A group of data buses connects the coder 16 outputs to data inputs of groups $17_0, \ldots 17_7$ forming a row 17 of gates for recording all digits of the first operand register 11 and to the data inputs of groups $18_0, \ldots 18_7$, forming a row 18 of gates for recording all digits of the second operand register 12. A control bus (not shown in the drawing), used to prepare the register 11 for recording, connects the control unit 10 with the first control inputs of all gates of the groups $17_0, \ldots, 17_7$ while a control bus (not shown in the drawing), used to prepare the register 12, connects it with the first control inputs of all gates of the groups $18_0, \ldots 18_7$.

The three low-digit outputs of reversible counters 19, 20 and 21 of the timing means 4 are connected to the corresponding inputs of decoders 22,23 and 24 of the timing means 4, respectively. The outputs of these decoders are connected digit-by-digit to the first control inputs of respective groups $5_0, \ldots 5_7, \ldots 6_0, \ldots 6_7$ and $7_0, \ldots 7_7$ of the first 5, the second 6 and the third 7 rows of the input gates of the arithmetic unit 1.

The outputs of the decoders 22 and 23 are connected also in digit-by-digit manner to the second control inputs of the corresponding groups $17_0, \ldots 17_7$ of the register 11 write -in gates and of the groups $18_0, \ldots 18_7$ of the register 12 write-in gates.

The outputs of the decoder 24 are connected also in the digit-by-digit manner to the first control inputs of corresponding groups $8_0, \ldots 8_7$ and $8_8, \ldots 8_{15}$ of the output gate row 8 in the arithmetic unit 1.

The fourth digit zero outputs of the counters 19, 20 and 21 are connected to the second control inputs of all gates in the first row 5, the second row 6 and the third row 7 of the input gates, respectively. The zero output of the counter 21 is connected also to the second control inputs of all gates of the groups $8_0, \ldots 8_7$ in the output gate row 8.

The fourth digit unit outputs of the counters 19, 20 and 21 are connected to respective inputs of the control device 10 with the use of buses (not shown in the drawing). The fourth digit unit output of the counter 21 is connected also to the second control inputs of all gates of the groups $8_8, \ldots 8_{15}$ in the output gate row 8. The outputs of the registers 11, 12 and 13 are connected in digit-by-digit manner with the corresponding inputs of the gate groups in the first 5, the second 6 and the third 7 rows of the input gates of the arithmetic unit 1, respectively.

The outputs of all groups in the first row 5 of the input gates of the arithmetic unit 1 are connected with the corresponding inputs of an input gate group 25 in the multiplying unit 2, of an input gate group 26 of the adding unit 3 and of a first operand code analysis unit 27.

The outputs of all groups in the second row 6 of input gates are connected with the corresponding inputs of an input gate group 28 in the multiplying unit 2, of an input gate group 29 in the adding unit 3 and of a second operand code analysis unit 30.

The outputs of all groups in the third row of input gates, are connected with the corresponding inputs of an input gate group 31 of the multiplying unit 2, of an input group 32 of the adding unit 3 and of a result code analysis unit 33. The outputs of the code analysis units 27, 30 and 33 are connected by buses (not shown in the drawing) with the corresponding inputs of the control device 10.

The first factor inputs of the multiplying unit 2 are connected with the corresponding outputs of the gate groups 25 and 31. The second factor inputs of the multiplying unit 2 are connected with the corresponding outputs of the gate group 28.

The product low-order digit outputs of the multiplying unit 2 are connected with the corresponding inputs of an input gate group 34 of the adding unit 3. The product high-order digit outputs of the multiplying unit 2 are connected with the corresponding inputs of an input gate group 35 of the adding unit 3.

The outputs of the input gate groups 26 and 29 of the adding unit 3 are connected with the corresponding data inputs of code converters 36 and 37, respectively.

The inputs of a units adder 38 of the adding unit 3 are connected with the corresponding outputs of the gate groups 32 and 34 and of the code converters 36 and 37. The inputs of a tens adder 39 of the adding unit 3 are connected with the corresponding outputs of the gate group 35. The carry output of the units adder 38 is connected with the corresponding input of a tens adder 39 while the transfer output of the tens adder 39 is connected with the corresponding input of a transfer counter 40.

The sum outputs of the units adder 39 are connected with the corresponding inputs of an output gate group 41 of the adding unit 3 while their outputs are connected with the corresponding inputs of all groups $8_0$, . . . $8_{15}$ in the output gate row 8 of the arithmetic unit 1.

The control inputs of the gate groups 25, 26, 28, 29, 31, 32, 34, 35 and 41, the control inputs of the code converters 36 and 37, the preparation and the complementary inputs of the counters 19, 20, 21 as well as the clearing and shift inputs of the adding unit 3 are connected through control buses (not shown in the drawing) with th corresponding outputs of the control unit 10.

The sequence of actions, performed by the operator of the computer described herein is as follows:

(a) enter the first operand; (b) press the control key corresponding to the type of the operation to be performed; (c) enter the second operand; (d) press the actuating key commanding the performance of the required operation.

The operands are entered in the natural order, with high-order digits being the first, so that the top bit of the operand will always enter the top digit of the register. The place of the low bit in the register depends on the word length of the operand. The first operand is entered in the register 11, the second, in the register 12.

The commutation of register inputs to enter the operands and to read out the results, as well as to interrogate registers when the computer is performing arithmetic operations, is accomplished with the help of the commutator of the arithmetic unit.

Consider the operation of the computer when data is entered and processed to perform adding, subtracting multiplying and dividing operations.

Data entering. When the first operand is being entered, the inputs of the register 11 are commutated through the reversible counter 19 and the decoder 22.

Every reversible counter of the commutator should be able generally to count from 0 to $2K-1$, where $K$ is the number of digits in a register. The counter 19 has four binary digits which correspond to the word length, accepted for the computer. Let the decimal digits of the register be denominated by decimal figures from 0 to 7 beginning with the low-order digit. Let every digit of the register correspond to such a state of the counter, in which the content of its three low-order digits is the binary equivalent of the given digit order. The outputs of these three low-order digits of the counter 19 are connected with the inputs of the binary decoder 22. In each of the eight states of these three low-order digits of the counter, the decoder output bus, corresponding to the given state, will have a signal that will be fed to the first control inputs of the respective write-in gate group of the register 11 to prepare the given digit receive data in the data entering mode of operation. In the interrogation mode, i.e., when the computer performs arithmetic operations, provided with fourth digit output of the counter 19 produces an interrogation enabling signal (this signal corresponds to a "0" in the fourth digit), the above mentioned signal of the decoder output bus brings out the data from the given digit through the corresponding input gate group in the row 5 of the arithmetic unit 1.

It is obvious that the states of counters indicate unambiguously the orders of register digits, which participate in the operation of the arithmetic unit at the given moment of time.

The counters operate under instructions fed from the control device 10 in accordance with the operations to be performed. This will be discussed later.

Prior to starting the entering operation, the commutator is in its initial state, viz., the control device 10 feeds the first control inputs of write-in gates of all the register 11 digit orders with a write-in preparation signal; the counter 19 is cleared to the state of 1111 and the subtraction input of this counter is fed with a preparation signal. Under these conditions, the input gate row 5 of the arithmetic unit is blocked due to the absence of a signal from the fourth order digit output of the counter 19 while the output bus 27 of the decoder 22 is excited. The result is that the seventh-order digit of the register 11 becomes prepared to receive data.

When the operator presses one of the keys of the numeric keyboard 14 that corresponds to the top-digit figure of the first operand, the coder 16 produces at its output the code of the respective figure, which passes through a group of data buses to be recorded-in this case as the seventh-order digit in the register 11.

After any numeric key is pressed and the corresponding code is recorded in the register, the control device 10 will generate a clock pulse, which is fed to th complementary input of the counter 19. The result is that the number of the counter state becomes one unit less and — in this case — the output bus 226 of the decoder 22 becomes excited, i.e., it is the sixth-order digit of the register 11, that is made ready to record the next figure of the first operand.

The other figures of the first operand are entered in the same manner.

When the first operand is entered, the operator presses one of the keys on the control keyboard 15 to indicate the nature of the operation to be performed. Now, the control device 10 generates a write-in preparation signal, which is fed to the first control inputs of all-digit recording gates of the second register 12, as well as a preparation signal for the subtraction input of the counter 20. Since prior to the data entering procedure the counters 19 and 20 have been cleared to the state 1111, it is the seventh-order digit of the register 12 that now becomes now prepared for data recording. The second operand is entered into this register in the same way as the first operand is entered in the register 11.

When the process of entering the first (second) operand is over, the state of the first (second) counter corresponds to the digit number of the first (second) register, which immediately follows the digit that has just received the low-digit figure of the first (second) operand. In a particular case when the length of a certain operand is equal to the number of digits in the register and thus the low-order digit of the operand has been put down in the 0-th digit of the register, the respective counter appears to be in the 1111 state.

The above sequence of the commutator operation in the course of operand entering takes place when the computer adds, subtracts or multiplies. When it divides, this standard sequence is modified to a certain extent. The required modifications will be described later.

The computer starts performing any arithmetic operation after the acting key is pressed. But the events actually involved in carrying out the corresponding operation are preceded by certain general preparatory procedures, viz: (a) the state numbers of the counters 19 and 20 become a unit higher, which prepares the interrogation of the low-order digits of both operands; (b) the fourth-order digits of the counters 19 and 20 are cleared to the "0" state, which enables the interrogation of the first and second registers.

Adding. Suppose before the operation starts, the following addends have been entered:

$A=a_2a_1a_0$ — into the register 11 of the first operand, and $B=b_4b_3b_2b_1b_0$ — into the register 12 of the second operand. These addends are placed in the registers as it was shown above (see the description of the entering procedure).

After that, in the course of performing the summing up operation, the control device 10 continuously feeds the code converters 36 and 37 with signals for direct code read-out. Before the adding operation starts, the reversible counter 21 is set to the 0000 state, due to which the 0-th digit of the result register 13 is made ready to receive information (i.e., the low-order digit of the sum). The control device 10 generates preparation signals for the summing inputs of the counters 19 20 and 21.

After the actuating key is pressed, the counters 19 and 20 are transferred to the states, which correspond to the interrogation of the units digits of the addends $a_0$ and $b_0$ (for the given case, the counter 19 state is 0101, the counter 20 state is 0011).

For the zero elementary cycle of the adding operation, the control device 10 feeds the gate group 26 with a command, due to which the direct code of $a_0$ arrives, via the code converter 36, to the inputs of the units adder 38 of the adding unit 3. Then, the control device 10 delivers a command to the gate group 29, due to which the direct code of $b_0$ is fed, via the code converter 37, to the inputs of the adder 38. The latter sums up the codes of $a_0$ and $b_0$. The adding procedure, the correction of the sum (if required) and the method of transfer to the next digit are not described here since they will depend on the particular coding system and the type of the adder. Moreover, they are performed in the usual way.

The results of the zero elementary cycle of the adding operation are: the low-order (zero) bit of the sum $C_0$ and a possible transfer to the next digit. The code of the sum $C_0$ from the adder 38 outputs is fed to the data inputs of the gate group 41. At the same time the control device 10 feeds the control inputs of the gate group 41 with a result read-out enabling signal, and the code of $C_0$ is recorded in the pre-prepared 0-th digit of the result register 13. The transfer bit to the next digit (if it has appeared) is stored in the adder 38 to take part in the following adding elementary cycle.

At the end of the zero elementary cycle, the commutator is prepared to perform the successive cycle, to which end the control device 10 emits a clock pulse fed to the complementary inputs of all three reversible counters. The result in the present case will be that the counter 19 is driven to the 0110 state, the counter 20—to the 0100 state and the counter 21—to the 0001 state. Thus, the interrogation of the $a_1$ and $b_1$ digits of the addends and the recording of results in the first digit of the register 13 are ensured.

The procedure of summing up the codes of $a_1$ and $b_1$ and the possible transfer bit from the previous cycle during the first elementary cycle is similar to that which has been performed during the zero elementary cycle, described above. The first elementary cycle results in producing the digit of $C_1$ of the sum and a possible transfer bit to the next digit.

This standard procedure of performing adding elementary cycles is repeated as long as there are meaningfull digits in both addends. A certain cycle will involve the processing of the top digit of one of the addends (in the present case it is the digit of $a_2$ of the first addend, which is processed during the second elementary cycle). After that the commutator operates in the following manner. At the end of the second elementary cycle a clock pulse brings the counter 19 to the state 1000 and the counter 20 to the state 0110. In the course of all successive elementary cycles (up to the end of the operation) the digit bits of the second addend are summed up with the bits of possible transfers from the previous digits, while the first addend presents the code of a zero (in the given coding system) to the adder, since the input gate row 5 of the arithmetic unit is blocked by a signal from the fourth order digit of the counter 19. The fourth elementary cycle (in the present case) will be devoted to the processing of the $b_4$-digit of the second addend to obtain the value of the $C_4$-digit of the sum, which will be recorded in the fourth digit of the result register 13. During this cycle counter 20 will pass over to the state 1000 while the counter 19 will remain in the state 1010. The fact that the fourth digits of the counters 19 and 20 simultaneously contain units indicates the end of the addend interrogation process. The control device uses this indication to stop the summing operation, provided there is no transfer bit from the last elementary cycle. If there is a transfer bit, the control device will record this transfer in the fifth digit of the result register and after that will finish the operation.

Subtracting. The minuend is entered into the first register 11 and the subtrahend, into the second register 12.

In the course of the first step of subtraction, the control device 10 continuously feeds the code converter 36 with commands for reading out direct codes and the code converter 37, with commands for reading out reverse codes.

During the first step of subtracting, the successive digit-by-digit adding of the direct code of the minuend to the reverse code of the subtrahend is performed in a way similar to that of the adding described above, the only difference being that the results are not recorded in the register 13, since at this stop the gate group 41 does not receive the result read-out enabling signal. The first step (comparison of operands) is considered to be over when the fourth-order digits of the counters 19 and 20 simultaneously acquire units. On receiving this indication the control device 10 starts analyzing the results of the comparison as to the presence of a transfer bit from the high-order digits of the figures that are being compared. The outcome of this analysis determines the control operations to be performed during the second step of subtracting. If there is a transfer bit from the high-order digit, i.e., if the minuend exceeds the subtrahend the commands, received by the code converters 36 and 37, for the second step will be the same as for the first step. If there is no transfer bit, i.e., if the minuend is less than the subtrahend, the code converter 36 will receive a command for reading out the reverse code and the code converter 37 will receive a command for reading out the direct code.

Additionally, while the system passes over to the second step of subtracting, the control device 10 performs the following: (a) sets the counter 21 to 0000 state, thus making the 0-th digit of the result register 13 ready to receive information (the low-order bit of the difference); (b) records a unit into the low-order binary digit of the units adder 38, thus ensuring that during the second step of subtracting, the operation of summing is performed in complementary codes; (c) clears the fourth-order digits of the counters 19 and 20 to the 0 state, thus enabling another interrogation of the registers 11 and 12 during the second step of subtracting.

At the beginning of the second step the states of the counters 19 and 20 depend on the relationship between the word lengths of the operands. The state of the counter for the longer operand will be 0000, the state of the counter for the shorter operand will be equal to the binary presentation of the difference between the operands' lengths.

When the preparatory operations described above are over, the computer starts performing the second step of subtracting. The indication that the subtracting operation is over is the presence of units in the fourth-order digits of the counters 19 and 20. Hence, the number of elementary adding cycles during the second step of subtracting is eight, irrespective of the operand word lengths. The zero cycle of the second step consists in interrogating both the 0-th digit of the register that stores the longer operand and that digit of the second register, whose order number is equal to the difference between the operand lengths. If the length of both operands is less than that of the registers, the operation performed during this cycle, will consist in interrogating "vacant" digits of both registers, i.e., the digits that contain no meaningful figures. During such cycles which can be called "idle," the code analysis units 27 and 30 of the registers 11 and 12 generate respective signals for the control device which, under these conditions, block the operation of the gate groups 26, 29 and 41 as well as that of the counter 21. The number of idle cycles is equal to the difference between the length of the register and that of the longer operand. If the length of at least one of the operands is equal to that of the register, there will be no idle cycles. During idle cycles, just as during conventional elementary ones, the summing inputs of the counters 19 and 20 receive preparation signals. Therefore, at a certain moment of time, the counter, which is interrogating the longer operand, passes over to the state that corresponds to the interrogation of the low-order digit of this operand. But since the counter of the other register recorded the difference between the operand lengths at the beginning of the second cycle, the low-order digit of the second operand will also be interrogated at the same moment of time. As soon as this state is reached, i.e., as soon as meaningful digits of the operands appear, the code analysis units 27 and 30 will, via the control device 10, unlock the counter 21 and the gate groups 26 29 and 41.

This is immediately followed by the zero elementary cycle of the second step of subtracting, which consists in adding the unit recorded previously in the adder 38 to the direct code of the low-order digit of the longer operand and to the reverse code of the low-order digit of the shorter operand. The result, i.e., the low-order digit of the difference, is recorded in the 0-th digit of the result register 13.

The subsequent elementary cycles of the second step are carried out in a similar way.

The end of a subtracting operation is indicated by units appearing in the fourth-order digits of both counters 19 and 20 during the second step.

Multiplying. The multiplicand is entered into the first operand register 11 and the multiplier into the second operand register 12.

While describing the procedure of performing an operation of multiplying, it has been shown earlier that to obtain the i-th digit of the product, it is necessary to form elementary products of all those pairs of factor digits, whose numbers give a sum equal to i. The selection of such digit pairs is the function of the timing means, which operates in accordance with the following rules.

In the course of every $i$-th elementary multiplying cycle one of the reversible counters (19 or 20) successively counts from 0 to $i$, while the other one counts from $i$ to 0. It is obvious that if, at the initial moment, the first counter determines the interrogation of the 0-th digit of one of the multipliers, while the second counter determines the interrogation of the $i$-th digit of the other factor, the count performed in two opposite directions will always give a sum of digit numbers equal to $i$.

The end of a successive elementary cycle is indicated by the fact that one of the counters passes over to the 0000 state.

When the computer passes from the $i$-th elementary cycle to the $(i+1)$-th one, the counter, which is in the i-state, receives an additional unit, while the other one remains in the zero state. During the $(i+1)$-th cycle, the count procedure is reversed: the first counter now counts from $(i+1)$ to 0, while the second counter goes from 0 to $(i+1)$. Thus the $(i+1)$-th cycle involves the interrogation of digits, whose numbers give a sum equal to $(i+1)$.

This succession of the reversible counters' operation is preserved during all the $2n$ elementary multiplying cycles. Then, beginning with the $(n-1)$-th elementary cycle, there appear in the system such digit number pairs one of which exceeds the number of bits of the operand. These digits, pairs and elementary products, that correspond to them, will be called "false." It is evident that the false elementary products should be disregarded in the process of obtaining partial products of respective elementary cycles. In the given commutation system this is done automaticaly, because as soon as any of the counters obtain a number, exceeding the number of bits in the register, the signal from the top-order digit of this counter will block the interrogation of the respective register. Thanks to this arrangement it is only meaningful digits of the factors that participate in forming partial products during all elementary multiplication cycles, including those whose numbers exceed $(n-1)$.

Now let us consider the operation of the arithmetic unit while multiplying two figures. According to the accepted procedure every elementary cycle produces a partial product, equal to the sum of all elementary products of the given cycle. To this end, the control device 10, while interrogating every pair of factor digits, generates control signals for the input gate groups 25 and 28 of the multiplying unit 2. The code of the first factor decimal figure is fed to the first factor inputs of the multiplying unit 2 and the code of the second factor figure is fed to the second factor inputs. At the same time the control device 10 produces control signals for the gate groups 34 and 35. The result is that the code of the elementary product low-order digit is fed to the input of the units adder 38, while the code of the elementary product high-order digit is fed to the input of the tens adder 39 of the adding unit 3. The adder 38 (39) performs the accumulation of untis (tens) of all elementary products in the given elementary cycle. Here, transfer bits from the adder 38 are fed to the adder 39, while transfer bits from the adder 39 are fed to the transfer counter 40. At the end of every elementary cycle the content of the units adder 38 is equal to the value of the corresponding digit of the final product. The control device 10 feeds the gate group 41 with a result read-out enabling signal and the code of the given figure in the final product is recorded in the digit of the result register 13, which has been prepared for recording. After that the control device 10 prepares the system for performing the following elementary cycle, viz., (a) it feeds the adding unit 3 with a right single-place decimal shift; (b) it switches the counter 21 over to the next state making the successive digit of the result register 13 ready to receive the next figure of the final product. It is necessary to point out that in the course of "processing" false factor digits, one of the input groups of the multiplying unit 2 is fed with the zero code (as per the accepted code system), due to which the false elementary products are equal to zero and have no effect on the partial products.

The above considerations pertained to the case of multiplying eight-bit operands when, at the beginning of the operation, the counters 19 and 20 were in the zero states. Generally, with arbitrary lengths of operands, when the write-in procedure is over, the counters are in the states, which correspond to the number of digits in the factor, while the low-order digits of the registers 11 and 12 appear to be "vacant." Here the length of the product, which is equal to the sum of the multipliers' lengths, is less than $2n$ and the multiplication is performed during a respective number of elementary cyles.

In the general case under consideration, the counters 19 and 20 are in certain non-zero states. The control device 10 starts operating in accordance with these initial conditions, i.e., it produces preparation signals for the subtraction input of the counter 20 and for the addition input of the counter 19. The cycle is over as soon as the counter 20 reaches the zero state. It is evident that it is only the first elementary product, that is formed during this cycle by meaningful (low-order) digits of both multipliers. Everyone of the other elementary products is formed with the participation of one of the second multiplier "vacant" digits. That is why they produce no effect on the partial product. Thus, the cycle, which is being considered now, results in the low-order (zero) digit of the final product and this cycle is considered to be the zero elementary one.

The subsequent events in the operation of the multiplication control circuit and in the arithmetic unit control procedure take place in accordance with the conditions specified above, but the partial products are formed only at the expense of the factors' meaningful digits.

Dividing. The divident is entered into the first operand register 11 and the divisor into the second operand register 12. The state number of the counter 19 is reduced as usual by one bit per every figure of the dividend that is entered into the register 11. When, however, the control key, which determines the operation of dividing, is pressed, the standard procedure of the reversible counters' operation is changed, viz., the counter 19 is cleared into the zero state, while the subtracting input of this counter is connected in parallel to the subtracting input of the counter 20. Thanks to this arrangement, the entering of the divisor reduces in synchronism the state numbers of the counters 19 and 20 by one bit per every figure that is being entered. When the divisor is entered and the actuating key is pressed, it appears that it is the registor 12 digit containing the low-order bit of the divisor and the similar digit of the register 11, that are ready for interrogation. Then, before the dividing procedure starts, the control device 10 performs the following operations:

(a) switches the function of multiplication control from the adding and subtracting inputs of the reversible counter 19 to the respective inputs of the reversible counter 21; (b) feeds a reverse code read-out signal to the code control gate group 32 to pass the code of the quotient figure that has just been tried to the adder 38. The adding input of the counter 19 receives a preparation signal, the result of which is that the counter 19, ready to perform the next elementary division cycle, is returned by the following clock pulse, to the state required to continue the preceding elementary cycle. After that the system starts performing the next trial multiplication procedure; (c) feeds control signals to the gate groups 28, 31, 34 and 35; (d) brings the counter 21 to the 0111 state, thus preparing the seventh digit of the result register 13 for recording the top-order bit of the quotient.

After that the procedure of dividing per se starts. Since the initial cycle is devoted to obtaining the top-order (seventh) digit of the quotient, this elementary division cycle, as assumed earlier, will be called the seventh one, while the subsequent cycles will have receding numbers.

Consider the operation of the computer while it performs the seventh elementary dividing cycle.

According to the accepted division procedure, the first trial figure of the quotient is 1. To obtain this figure, a signal of the control device 10 transfers a unit code to the units adder 38. Then, the control device 10 feeds the gate group 41 with a control signal, due to which the unit code is delivered to the prepared seventh digit of the result register 13. Then, the computer starts trying to multiply the given (trial) value of the quotient by the divisior and simultaneously compares digit-by-digit the bits of the trial divisor multiple, that are being computed, with the respective bits of the dividend. The role of the object of this trial multiplication procedure is played by the content of the registers 12 and 13, which are interrogated by counters 20 and 21.

Every elementary cycle of the trial multiplication procedure involves the interrogation of a pair of bits from the registers 12 and 13, which are formed according to the known multiplication rules, while the figures of the quotient are transferred, via the gate group 31, to the first multiplier inputs of the multiplying unit 2 and the figures of the divisor are transferred, via the gate group 28, to the second multiplier inputs. Elementary products produced by the multiplying unit 2 are transferred to the inputs of the adders 38 and 39 via the gate groups 34 and 35.

The zero elementary cycle of the first trial multiplication of the seventh elementary divison cycle results in obtaining the exact zero digit figure of the first trail divisor multiple in the adder 38. Then the control device 10 produces a command signal for the gate group 26 and the adder 32 receives the reverse code of the divident bit, which corresponds to the low-order digit of the divisor (since it is this digit, that is interrogated by the counter 19 after the write-in procedure is over). The adder 38 compared these codes, while the possible transfer bit goes to the adder 39. Then, the control device 10 produces a signal for a right decimal single-place shift in the content of the adding unit 3. The content of the adder 38 is erased, while the content of the adder 39 is transferred to the adder 38. After that, the content of the counter 19 is increased by one unit, due to which the next place of the quotient is prepared for comparison during the following elementary cycle of the given trial multiplication procedure.

When all elementary cycles of the first trial multiplication procedure of the seventh elementary division cycle are over and when all bits of the first trial divisor multiple are compared with the respective digits of the dividend, the counter 19 passes over to the 1000 state, while the counter 20 or the counter 21 goes to the zero-state, generating at the same time an overflow signal, which is fed to the control device and which indicated that the trial multiplication procedure is over.

The next step consists in preparing the counters 19, 20 and 21 to the subsequent elementary division cycle. To this end, the adding inputs of the counters 19 and 20 are being fed with preparation signals, until there is a signal at the output of the code analysis unit 30 of the register 12. The result is that the counters 19 and 20 again pass over to a similar state, whose number corresponds to that of the register 12 digit, which stores the low-order bit of the divisor. Then, the adding inputs of the counters 19 and 21 start receiving preparation signals, which are being fed until there is a signal at the output of the code analysis unit 33 of the result register 13. The result is that the counter 21 again passes over to a state, which corresponds to the interrogation of the seventh digit of the register 13, while the counter 19 passes over to a state, which corresponds to the interrogation of a register 11 digit, whose number is one unit less than that in the preceding trial.

Then, the results of comparison are analyzed. Two cases are possible:

a. The adder 38 contains a transfer bit. It means that the quotient under trial has exceeded the correct value. In this case the control unit 10 generates a command signal for the gate group 32 to pass the code of a quotient trial figure to the adder 38. Then, this adder receives the complementary unit code (i.e., the quotient trial figure becomes one unit smaller), the gate group 41 receives a command signal and the correct quotient figure is passed over to the respective place of the result register 13.

The next step of the procedure consists in that a preparation signal is fed to the subtracting input of the counter 21, while the following clock pulse drives it to the state, which corresponds to the processing of the next low-order digit of the quotient. If in this case the counter 21 appears to be in the 1111 state (which means that the previous elementary division cycle has resulted in the 0-th digit of the quotient) the control device will end the division procedure. Otherwise the system passes over to the 0-th elementary cycle of the first trial multiplication procedure to perform the next (the 6-th one) elementary cycle of the division procedure, which is carried out in the same manner as described above.

b. The adder 38 contains no transfer bit. This means that the quotient figure under trial is either less, than the correct value or is equal to it. In this case the system tries to increase the trial figure of the quotient (the next trial multiplication step). To this end, the control device 10 generates a command signal for the gate group 32 to pass the code of the quotient figure, that has just been tried, to the adder 38. The adding input of the counter 19 receives a preparation signal, the result of which is that the counter 19, ready to perform the next elementary divison cycle, is returned by the following clock pulse, to the state required to continue the preceding elementary cycle. After that the system starts performing the next trial multiplication procedure.

What is claimed is:

1. An arithmetic unit comprising: a unit for multiplying one-digit numbers including respective input gates; an adding unit including respective input and output gates, a first row, a second row and a third row of arithmetic unit input gates; a row of output gates of the arithmetic unit and a timing means;

said adding unit comprising first and second code converters, a single-place low-order digit adder, a single-place high-order digit adder and a carry counter;

said gates being divided into groups in accordance with a predetermined code system;

said multiplying unit having first factor inputs, second factor inputs, low-order digit outputs of the product and high-order digit outputs of the products;

said multiplying unit including input gates arranged in first, second and third groups;

said adding unit input gates consisting of first, second third, fourth and fifth groups;

said adding unit output gates consisting of one group;

said timing means being operative for ensuring sequences of operations of said arithmetic unit input and output gates to perform arithmetic operations;

the inputs of said first group of multiplying unit input gates being connected with the inputs of said first group of adding unit input gates and with the outputs of all groups in said first row of arithmetic unit input gates;

the inputs of said second group of multiplying unit input gates being connected with the inputs of said second group of adding unit input gates and with the outputs of all groups in said second row of arithmetic unit input gates;

the inputs of said third group of multiplying unit input gates being connected with the inputs of said third group of adding unit input gates and with the outputs of all groups in said third row of arithmetic unit input gates;

said first factor inputs of the multiplying unit being connected with the outputs of said first group of multiplying unit input gates and with the outputs of said third input gate group of said multiplying unit;

said second factor inputs of the multiplying unit being connected with the outputs of said second input gate group of said multiplying unit;

said fourth group of adding unit input gates being connected with said product low-order digit outputs of said multiplying unit;

said fifth group of adding unit input gates being connected with said product high-order digit outputs of said multiplying unit;

the outputs of said first group of adding unit input gates being connected with respective inputs of said first code converter of adding unit;

the outputs of said second group of adding unit input gates being connected with respective inputs of said second code converter of adding unit;

the inputs of said single-place low-order digit adder of the adding unit being connected with respective outputs of third and fourth input gate groups in the adding unit and with respective outputs of said first and second code converters in the adding unit;

the inputs of said single-place high-order digit adder of the adding unit being connected with respective outputs of said fifth input gate group in the adder unit;

the carry output of said single-place low-order digit adder of the adding unit being connected with respective inputs of said single-place high-order digit adder of the adding unit;

the carry output of said single-place high-order digit adder of the adding unit being connected with the input of said carry counter of the adding unit;

the sum outputs of said single-place low-order digit adder of the adding unit being connected with respective inputs of said group of adding unit output gates;

the outputs of said group of adding unit output gates being connected with respective inputs of all groups in said row of output gates of the arithmetic unit.

2. An arithmetic unit, as claimed in claim 1, in which the timing means comprises three reversible binary counters and three decoders where all digit outputs of the first reversible counter, except the high-order bit output, are connected to respective inputs of the first decoder, whose outputs are connected in a digit-by-digit manner to the first control inputs of all input gates in the respective first row groups; the second control inputs of all first row gates are connected in parallel to the zero output of the first reversible counter high-order digit; all digit outputs of the second reversible counter, except the high-order bit output, are connected to respective inputs of the second decoder, whose outputs are connected in a digit-by-digit manner to the first control inputs of all input gates in the respective second row groups; the second control inputs of all second row gates are connected in parallel to the zero output of the second reversible counter high-order digit; all digit outputs of the third reversible counter, except the high-order bit output, are connected to respective inputs of the third decoder, whose outputs are connected in digit-by-digit manner to the first control inputs of all input gates in the respective third row groups and to the control inputs in respective output gate groups of the arithmetic unit, the second control inputs of all third row gates are connected in parallel to the zero output of the third reversible counter high-order digit.

* * * * *